United States Patent
Park (10) Patent No.: US 11,193,298 B2
(45) Date of Patent: Dec. 7, 2021

(54) ROOF-TOP TENT FOR VEHICLE

(71) Applicant: IKAMPER CO., LTD., Paju-si (KR)

(72) Inventor: Soon Gyu Park, Paju-si (KR)

(73) Assignee: IKAMPER CO., LTD., Paju-si (KR)

( * ) Notice: Subject to any disclaimer, the term of this patent is extended or adjusted under 35 U.S.C. 154(b) by 0 days.

(21) Appl. No.: 17/073,775

(22) Filed: Oct. 19, 2020

(65) Prior Publication Data

US 2021/0032894 A1 Feb. 4, 2021

Related U.S. Application Data

(63) Continuation of application No. 16/627,477, filed as application No. PCT/KR2019/003600 on Mar. 27, 2019, now Pat. No. 10,808,416.

(30) Foreign Application Priority Data

Jul. 12, 2018 (KR) .................. 10-2018-0081316

(51) Int. Cl.
   *E04H 15/06* (2006.01)
   *B60P 3/38* (2006.01)
   *E04H 15/48* (2006.01)
   *E04H 15/56* (2006.01)

(52) U.S. Cl.
   CPC ............. *E04H 15/06* (2013.01); *B60P 3/38* (2013.01); *E04H 15/48* (2013.01); *E04H 15/56* (2013.01)

(58) Field of Classification Search
   CPC ......... E04H 15/06; E04H 15/48; E04H 15/56; B60P 3/38
   See application file for complete search history.

(56) References Cited

U.S. PATENT DOCUMENTS

| | | | |
|---|---|---|---|
| 3,375,836 | A | 4/1968 | Domeneghetti |
| 4,058,133 | A | 11/1977 | Barr et al. |
| 4,396,030 | A | 8/1983 | Ferguson |
| 9,580,928 | B1 | 2/2017 | Currid |
| 10,125,517 | B2 | 11/2018 | Xu |

(Continued)

FOREIGN PATENT DOCUMENTS

JP 2000-345741 A 12/2000

OTHER PUBLICATIONS

Korean Office Action dated Dec. 1, 2018, in connection with corresponding KR Application No. 10-2018-0081316 (10 pgs., including machine-generated English translation).

(Continued)

*Primary Examiner* — Noah Chandler Hawk
(74) *Attorney, Agent, or Firm* — Maier & Maier, PLLC (57) ABSTRACT

A roof-top tent for a vehicle. The roof-top tent includes a first and second cover portion including a first and a second plate member provided in a plate shape; a hinge connection portion rotatably connecting the first and the second cover portion and the second cover portion; a waterproof portion having both ends fastened to the first and the second cover portion; and a tent portion coupled to the first and the second cover portion, where one of the first and the second cover portion is provided so as to be fixedly installed on a roof of a vehicle, where the roof-top tent has a folding mode and an unfolding, and where the waterproof portion is detachably fastened to a rim of the first cover portion and the second cover portion in the folding mode to close the space between the first cover portion and the second cover portion.

19 Claims, 7 Drawing Sheets

(56) References Cited

U.S. PATENT DOCUMENTS

2010/0263698 A1   10/2010   Chiu

OTHER PUBLICATIONS

Korean Office Action dated Apr. 30, 2019, in connection with corresponding KR Application No. 10-2018-0081316 (8 pgs., including machine-generated English translation).
Korean Grant of Patent (Notice of Allowance) dated Jul. 4, 2019, in connection with corresponding KR Application No. 10-2018-0081316 (7 pgs., including machine-generated English translation).
International Search Report dated Jun. 27, 2019 in corresponding International application No. PCT/KR2019/003600; 3 pgs.

ROOF-TOP TENT FOR VEHICLE

CROSS-REFERENCE TO RELATED APPLICATIONS

This application is a continuation of U.S. patent application Ser. No. 16/627,477, filed Dec. 30, 2019 and entitled "ROOF-TOP TENT FOR VEHICLE", the entire contents of which are hereby incorporated by reference.

FIELD

The present disclosure relates to a roof-top tent for a vehicle.

BACKGROUND

Generally, a tent is an assembled or mobile house that can be disassembled and transported. Nowadays, the tent is used for military, exploration, mountain climbing and camping purposes, mainly for temporary camps, rather than for daily residential use.

The tent varies in shape, size and material depending on the purpose of use, location, the number of people and season. There are various types of tents in use and size, such as large tents used in outdoor concerts, theater and circuses as well as tents used for military and school camping.

In particular, tents used for leisure activities such as mountain climbing, camping and traveling have a size for 5 to 10 people to be carried by one person. In tents for leisure, there are tents in various shapes such as a triangular shape, a roofed shape, a house shape, a one-sided inclined shape, a half-moon shape, and a dome shape.

However, such a conventional tent is inconvenient to move due to its large volume, and difficult to assemble and disassemble. Also, it is complicated in structure, resulting in frequent breakdowns of joints. Particularly, when using a tent for leisure, a user travels to a campsite mainly by using a vehicle, and then installs a tent prepared for use. The tent stored in the vehicle is so bulky that it is difficult to store a large number of supplies together with the tent and it is inconvenient to take out the stored tent from the vehicle and install it on the camp site.

Further, since a flat ground surface must be secured to unfold and install the tent, there has been a restriction in the location selection for installing the tent.

In order to solve the problems of the conventional tent, a roof-top tent for a vehicle has been proposed as disclosed in Korean Patent No. 10-1436951. This roof-top tent is often referred to as a car pension, in which the tent is installed on a vehicle roof to be used as a mobile home. Unlike a large trailer or a camper, the vehicle roof-top tent, as a combination of leisure and automobile culture, has an advantage that it can be easily installed in a vehicle and operated.

The conventional roof-top tent for a vehicle is configured to be covered with a waterproof cover made of tarpaulin to prevent the tent from getting wet in the rain. In this case, when the vehicle is traveling, the wind is infiltrated into the waterproof cover made of the material which is usually used for cloth, which may interfere with a driver's vision. Further, the waterproof cover may act as a resistance during driving to lower the driving efficiency, and has not a good appearance.

SUMMARY

In view of the above, the present disclosure provides a roof-top tent which can minimize the resistance during driving without disturbing a driver's view during driving and has a neat appearance.

According to an aspect of the present invention, there is provided a roof-top tent comprising: a first cover portion including a first plate member provided in a plate shape; a second cover portion including a second plate member provided in a plate shape; a hinge connection portion rotatably connecting the first cover portion and the second cover portion; a waterproof portion having both ends fastened to the first cover portion and the second cover portion; and a tent portion coupled to the first cover portion and the second cover portion, wherein one of the first cover portion and the second cover portion is provided so as to be fixedly installed on a roof of a vehicle, wherein the roof-top tent has a folding mode in which the first cover portion and the second cover portion are arranged to face each other and the tent portion is accommodated in a space between the first cover portion and the second cover portion, and an unfolding mode in which the tent portion is unfolded by rotating one of the first cover portion and the second cover portion around the hinge connection portion with respect to the other one, and wherein the waterproof portion is detachably fastened to a rim of the first cover portion and the second cover portion in the folding mode to close the space between the first cover portion and the second cover portion.

According to embodiments of the present disclosure, it is possible to minimize the resistance without disturbing a driver's view during driving. Also, it is possible to attract consumers' interest because of a neat appearance of the roof-top tent.

DETAILED DESCRIPTION

Hereinafter, exemplary embodiments of the present disclosure will be described in detail with reference to the accompanying drawings.

In the following description, a detailed description of known functions and configurations incorporated herein will be omitted when it may obscure the subject matter of the present invention.

When a component is described as being "connected" or "contacted" to the other component, it may be directly connected or contacted to the other component, but it should be understood that another component may exist between the component and the other component.

The terms used herein are employed to describe only specific embodiments and are not intended to limit the present disclosure. Unless the context clearly dictates otherwise, the singular form includes the plural form.

Hereinafter, a roof-top tent for a vehicle according to an embodiment of the present invention will be described with reference to the drawings.

Figure 1:
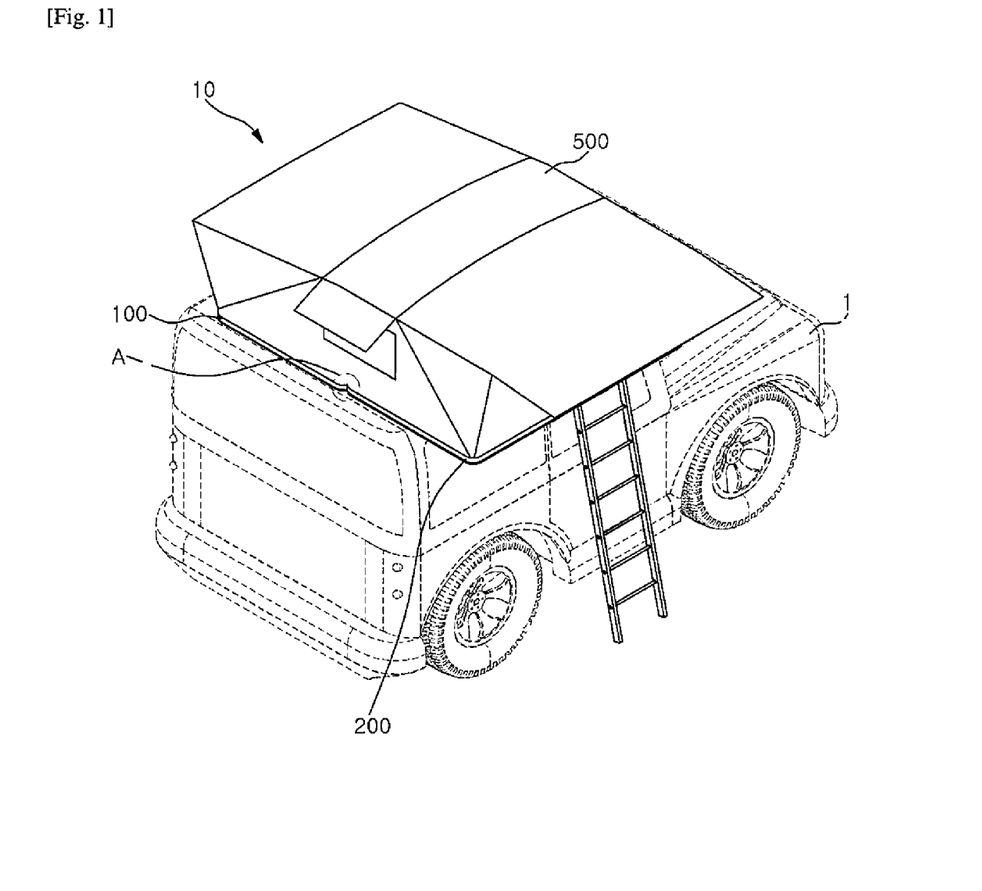
FIG. 1 is a perspective view showing a state where a roof-top tent is installed according to an embodiment of the present invention.

Referring to FIG. 1, a roof-top tent 10 for a vehicle according to an embodiment of the present invention can be transported while being fixedly installed on a roof of a vehicle 1. In order to use it for residence at a campsite, a tent installation can be completed by a simple unfolding operation in a state where it is mounted on the roof of the vehicle 1. The vehicle roof-top tent 10 may be installed such that a portion protruding outwardly from the roof of the vehicle 1 can be supported using a member such as a ladder after the completion of the installation.

The vehicle roof-top tent 10 includes a first cover portion 100, a second cover portion 200, a hinge connection portion 300, a waterproof portion 400 and a tent portion 500. Specifically, the first cover portion 100 includes a first plate member 110 provided in a plate shape, and the second cover portion 200 includes a second plate member 210 provided in a plate shape. The hinge connection portion 300 rotatably connects the first cover portion 100 to the second cover portion 200. The waterproof portion 400 is fastened at both ends to the first cover portion 100 and the second cover portion 200. The tent portion 500 is coupled to the first cover portion 100 and the second cover portion 200.

With this configuration, the first cover portion 100 is unfolded while being rotated around the hinge connection portion 300 while the second cover portion 200 is fixedly installed on the roof of the vehicle 1. Accordingly, the tent portion 500 stored by the first cover portion 100 and the second cover portion 200 is unfolded so that an original form as a tent can be produced as shown in FIG. 1. In other words, the vehicle roof-top tent 10 has a folding mode as shown in FIG. 2 in which the first cover portion 100 and the second cover portion 200 are arranged in parallel to each other and the tent portion 500 is accommodated in a space between the first cover portion 100 and the second cover portion 200, and an unfolding mode as shown in FIG. 1 in which the tent portion 500 is unfolded by rotating the first cover portion 100 around the hinge connection portion 300 with respect to the second cover portion 200.

Figure 2:
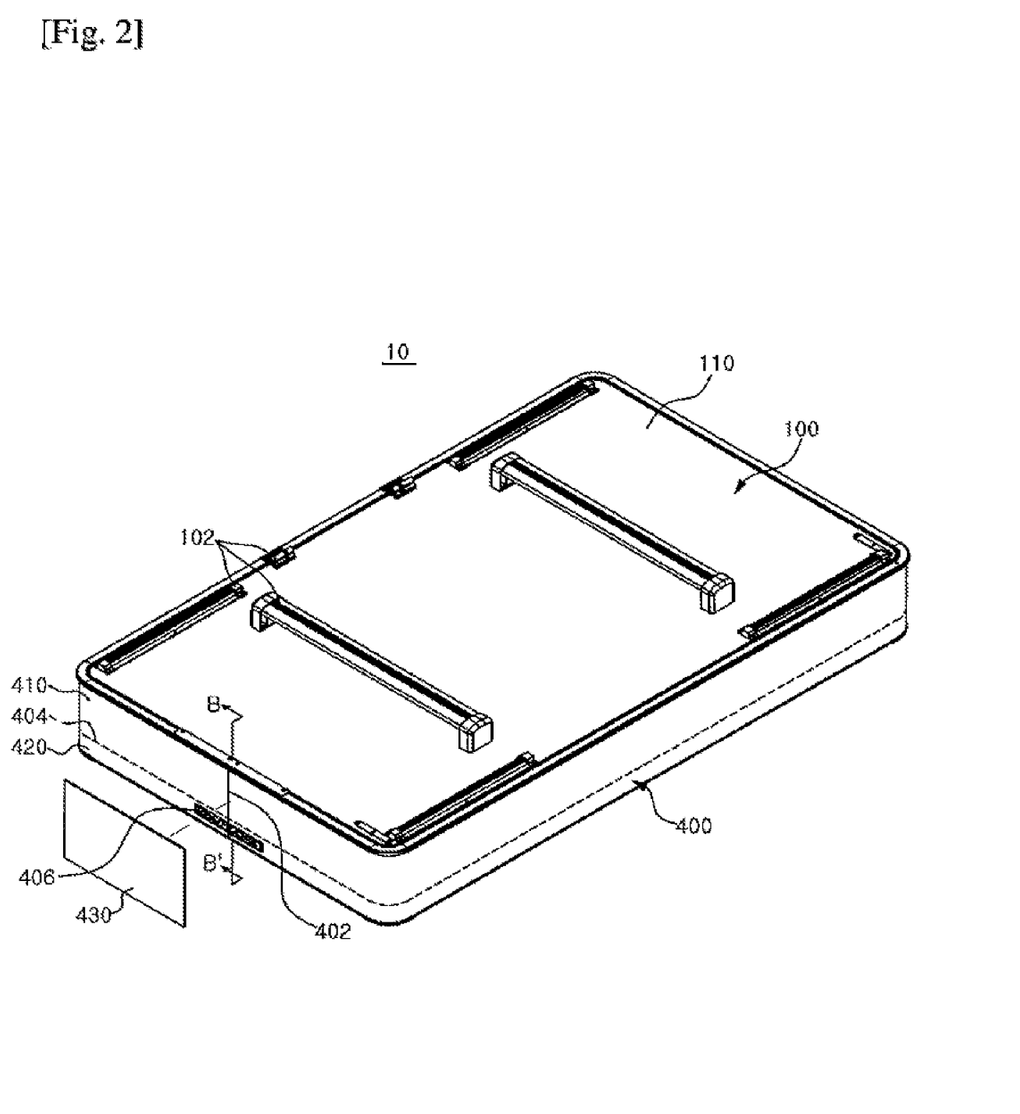
FIG. 2 is a perspective view showing a state in which the roof-top tent of FIG. 1 is folded.
Figure 3:
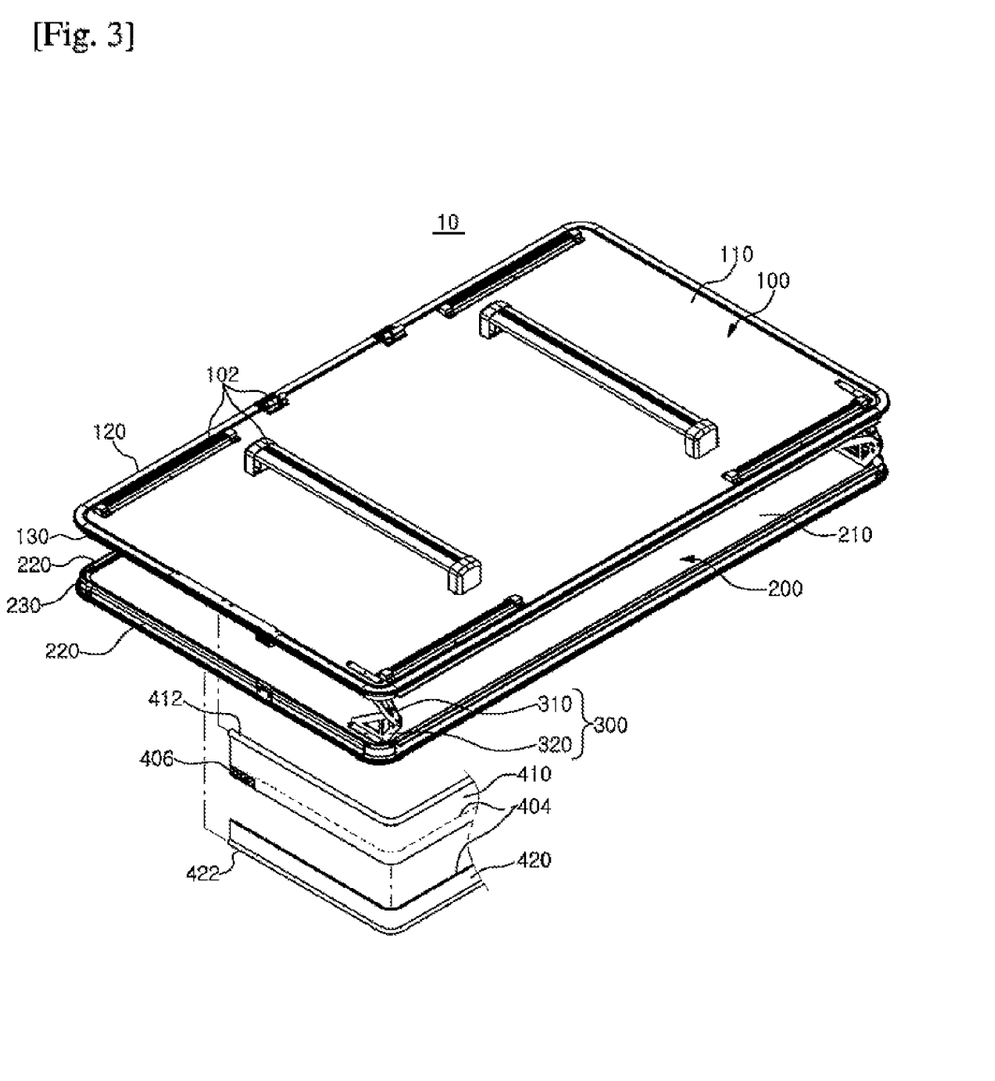
FIG. 3 is an exploded perspective view showing a state in which a waterproof portion is separated from the roof-top tent of FIG. 2.

Referring to FIGS. 2 and 3, the first cover portion 100 includes the first plate member 110, a first edge frame 120 and a first corner frame 130. The first cover portion 100 covers one surface of a storage space for storing the tent portion 500 and includes the first plate member 110 for this purpose. The first plate member 110 may be provided in a simple flat plate shape, and may have an outer surface facing the outside and an inner surface facing the space in which the tent portion 500 is accommodated. Further, each of the four corners of the first plate member 110 may be formed in a round shape, and external members 102 including hinges for fastening a ladder, beams for fixing other items and the like may be provided at an outer surface of the first plate member 110.

The first edge frame 120 is a frame installed along four corners of the first plate member 110 and may be made of a light solid material such as aluminum. The first edge frame 120 may include an upper frame 121 and a lower frame 126.

Figure 5:
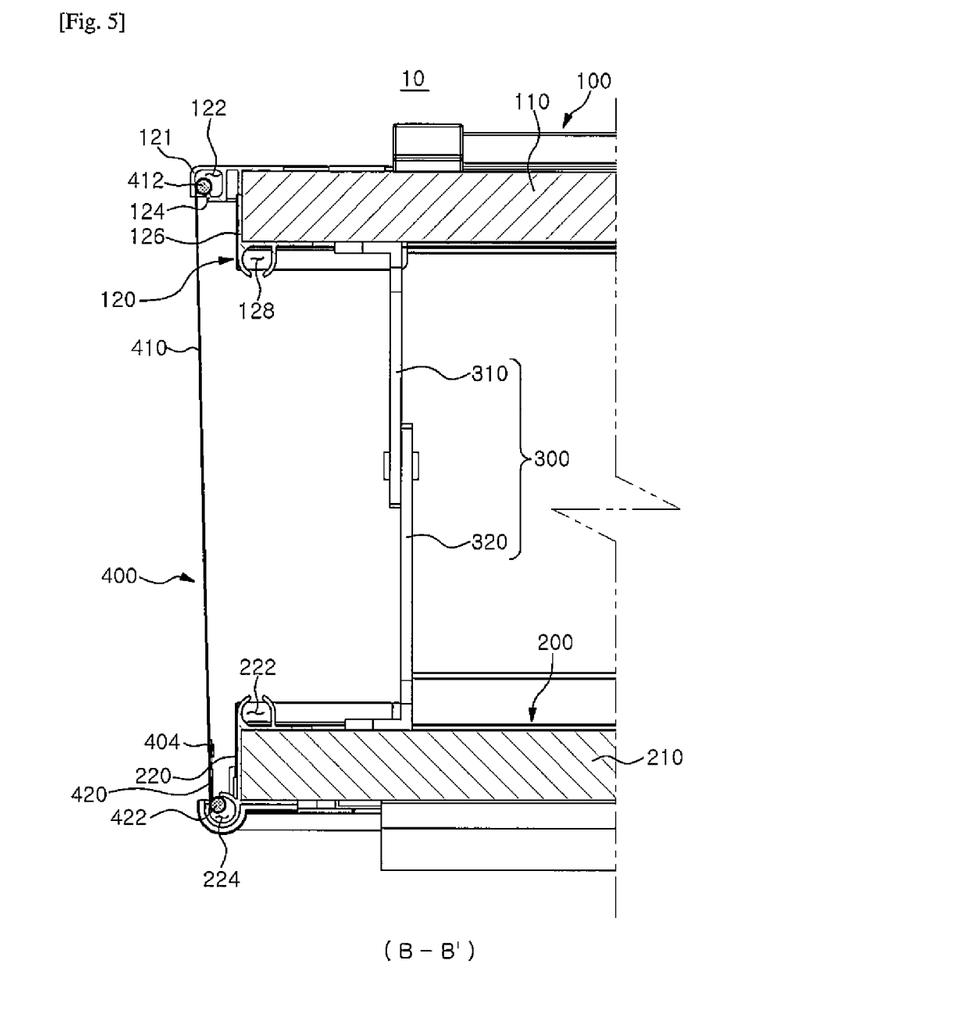
FIG. 5 is a partial cross-sectional view taken along line B-B' of FIG. 2.

Referring to FIG. 5, the upper frame 121 may be a frame having a continuous loop shape along the rim of the first plate member 110, and a portion of the upper frame 121 corresponding to a corner portion of the first plate member 110 may have a round shape corresponding to the first plate member 110. Further, a first waterproof member fastening passage 122 having a shape to allow insertion of a first fastening rod 412 of the waterproof portion 400 to be described later is formed on one side of the upper frame 121.

The first waterproof member fastening passage 122 may include a gap formed with respect to a surface facing the second cover portion 200. This gap is formed such that the first waterproof member fastening passage 122 is opened over the entire length of the upper frame 121, and a first waterproof member 410 to be described later may be passed through the gap. Further, the first waterproof member fastening passage 122 may be formed to extend continuously along the longitudinal direction of the upper frame 121, i.e., along the circumference of the loop, and may be opened to an outside at both ends of the upper frame 121. Accordingly, the first waterproof member 410 may be fastened to the first corner frame 120 along the four edges of the first plate member 110.

Further, a waterproof protrusion 124 may be formed to protrude from the inner surface of the first waterproof member fastening passage 122. The waterproof protrusion 124 may be formed as a wall forming a gap formed in the first waterproof member fastening passage 122 to prevent separation of the first fastening rod 412 fastened to the first waterproof member fastening passage 122, and assist the first fastening rod 412 to seal the gap so that a waterproof can be effectively achieved.

The lower frame 126 may be provided for each of the four edges of the first plate member 110 and may be coupled to the edge of the first plate member 110 below the upper frame 121. A first tent fixing passage 128 is formed on one side of the lower frame 126 and the tent portion 500 can be fastened and fixed through the first tent fixing passage 128.

Figure 6:
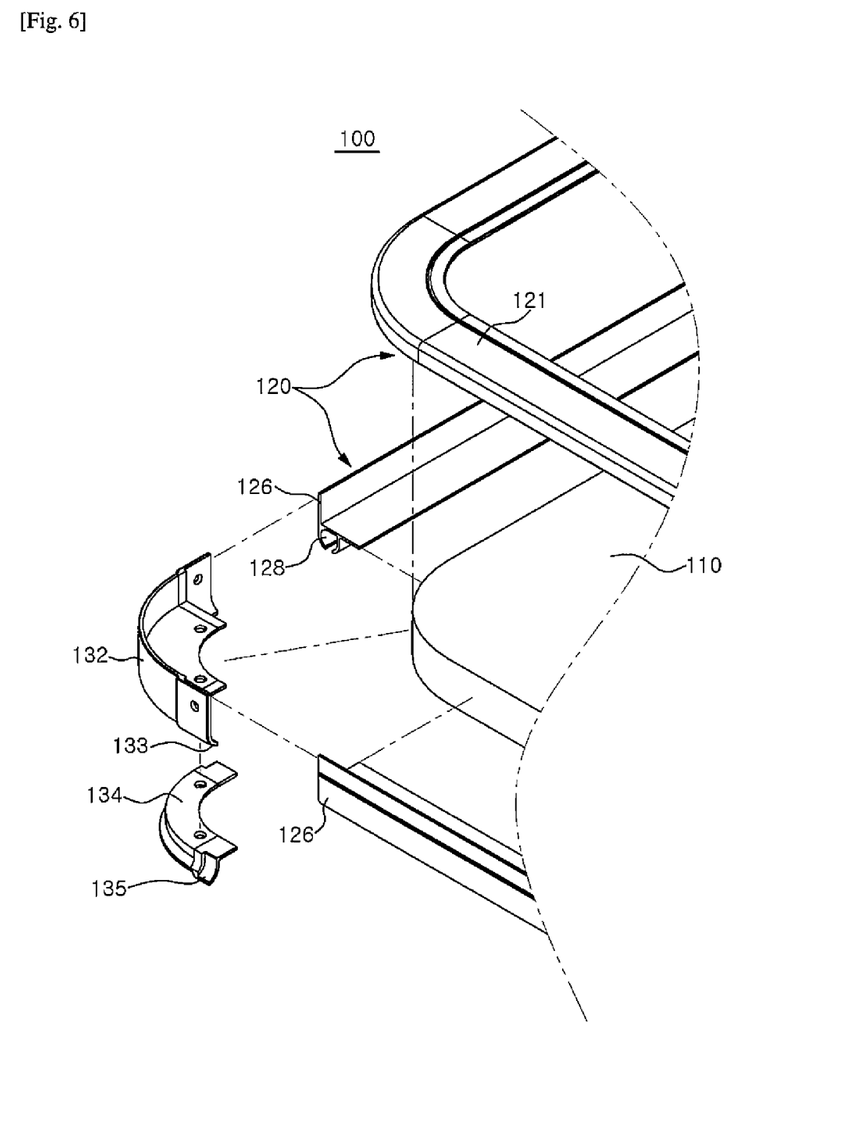
FIG. 6 is an exploded perspective view of a first cover portion of the roof-top tent of FIG. 2.

Referring to FIG. 6, the first corner frame 130 is provided to cover at least one of the corner portions of the first plate member 110. For example, the first corner frame 130 may be provided at every corner portion of the first plate member 110. The first corner frame 130 may have a round shape corresponding to the corner shape of the first plate member 110.

Further, the first corner frame 130 may include an outer fastening member 132 fastened to the corner portion of the first plate member 110 and an inner fastening member 134 fastened to the outer fastening member 132 and the first plate member 110 so as to at least partially overlap the outer fastening member 132. In other words, the first corner frame 130 may be provided in a form in which two members are assembled.

The outer fastening member 132 may form the outermost surface of the first corner frame 130, and may be connected to the lower frame 126 while being provided on the lower side of the upper frame 121 to extend an upper end portion of the lower frame 126. Further, the outer fastening member 132 may include an outer lower edge 133 having a shape to extend a portion of the lower frame 126 forming the first tent fixing passage 128.

The inner fastening member 134 may partially overlap the outer fastening member 132 to be fastened to the first plate member 110 and the outer fastening member 132. The inner fastening member 134 may include an inner lower edge 135 having a shape to extend a lower end portion of the lower frame 126 forming the first tent fixing passage 128.

Meanwhile, referring again to FIGS. 2 and 3, the second cover portion 200, which is rotatably connected to the first cover portion 100 to form a space in which the tent portion 500 is accommodated, includes the second plate member 210, a second edge frame 220 and a second corner frame 230. The second cover portion 200 covers the other surface of the storage space for storing the tent portion 500 and includes the second plate member 210 for this purpose. The second plate member 210 may be provided in a simple flat plate shape, and may have an outer surface facing the outside and an inner surface facing the space in which the tent portion 500 is accommodated. Further, each of the four corners of the second plate member 210 may be formed in a round shape, and a member (not shown) may be provided on the outer surface of the second plate member 210 so as to be fixedly installed on the roof of the vehicle 1.

Figure 7:
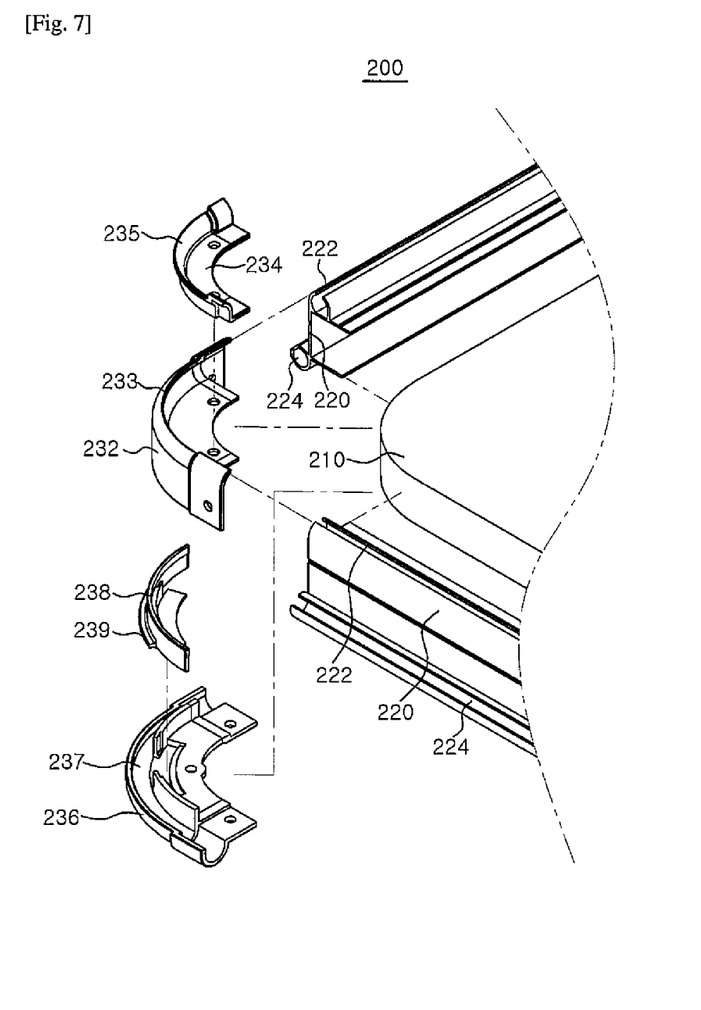
FIG. 7 is an exploded perspective view of a second cover portion of the roof-top tent of FIG. 2.

The second edge frame 220 is a frame installed along four edges of the second plate member 210 and may be made of a light solid material such as aluminum. Referring to FIG. 7, a second waterproof member fastening passage 224 having a shape to allow insertion of a second fastening rod 422 is formed in the second edge frame 220.

Referring to FIG. 5, the second waterproof member fastening passage 224 may include a gap formed with respect to a surface facing the first cover portion 100. This gap is formed such that the second waterproof member fastening passage 224 is opened over the entire length of the second edge frame 220, and a second waterproof member 420 to be described later may be passed through the gap. Further, the second waterproof member fastening passage 224 may be formed to extend continuously along the longitudinal direction of the second edge frame 220. Accordingly, the second waterproof member 420 may be fastened to the second edge frame 220 along the four edges of the second plate member 210.

Further, a second tent fixing passage 222 is additionally formed in the second edge frame 220, and the tent portion 500 can be fastened and fixed through the second tent fixing passage 222. The second tent fixing passage 222 may be formed at a position opposite to the first tent fixing passage 128 and may be formed at a position closer to the second plate member 210 than the second waterproof member fastening passage 224. Accordingly, the waterproof portion 400 can be fastened to the outside of the tent portion 500.

The second corner frame 230 is provided to cover at least one of the corner portions of the second plate member 210. For example, the second corner frame 230 may be provided at every corner portion of the second plate member 210. The second corner frame 230 may have a round shape corresponding to the corner shape of the second plate member 210.

Further, the second corner frame 230 may include an outer fastening member 232 for a tent to be fastened to the corner portion of the second plate member 210 so as to be in contact with one surface of the second plate member 210, and an inner fastening member 234 for a tent to be fastened to the tent outer fastening member 232 so as to at least partially overlap the tent outer fastening member 232. Also, the second corner frame 230 may include a waterproof outer fastening member 236 fastened to the corner portion of the second plate member 210 so as to be in contact with the other surface of the second plate member 210, a waterproof inner fastening member 238 fastened to the waterproof outer fastening member 236 so as to at least partially overlap the waterproof outer fastening member 236, and a fastening rod fixing protrusion 239 protruding from the surface of the waterproof inner fastening member 238 to prevent separation of the waterproof portion 400 fastened to the second cover portion 200.

In the present embodiment, it is described for example that the fastening rod fixing protrusion 239 is formed on the waterproof inner fastening member 238, but the present invention is not limited thereto. For example, the fastening rod fixing protrusion 240 may be formed in at least one of the tent outer fastening member 232, the tent inner fastening member 234, the waterproof outer fastening member 236 and the waterproof inner fastening member 238.

The tent outer fastening member 232 may form the outermost surface of the second corner frame 230 and may be connected to the second edge frame 220 to extend the shape of the second edge frame 220. Further, the tent outer fastening member 232 may include an outer upper edge 233 having a shape to extend a portion of the second edge frame 220 forming the second tent fixing passage 222.

The tent inner fastening member 234 may partially overlap the tent outer fastening member 232 to be fastened to the second plate member 210 and the tent outer fastening member 232. The tent inner fastening member 234 may include an inner upper edge 235 having a shape to extend the remaining shape of the second edge frame 220 forming the second tent fixing passage 222.

The waterproof outer fastening member 236 may form a lower portion of the second corner frame 230 and may be connected to the second waterproof member fastening passage 224 so as to include a second corner side fastening passage 237 in which the second fastening rod 422 is accommodated. The second corner side fastening passage 237 may be formed to receive and support the second fastening rod 422 in a semicircular shape.

The waterproof inner fastening member 238 may partially overlap the waterproof outer fastening member 236 to be fastened to the second plate member 210 and the waterproof outer fastening member 236. The fastening rod fixing protrusion 239 may be formed to protrude from the surface of the waterproof outer fastening member 236.

The fastening rod fixing protrusion 239 is disposed on the upper side of the second corner side fastening passage 237 and may be provided in contact with the upper surface of the second fastening rod 422 received in the second corner side fastening passage 237 to prevent separation of the second fastening rod 422.

The configurations of the first cover portion 100 and the second cover portion 200 as described above can be modified if necessary. For example, the first cover portion 100 may be configured to include the second plate member 210, the second corner frame 220 and the second corner frame 230, and the second cover portion 200 may be configured to include the first plate member 110, the first corner frame 120 and the first corner frame 130.

Figure 4:
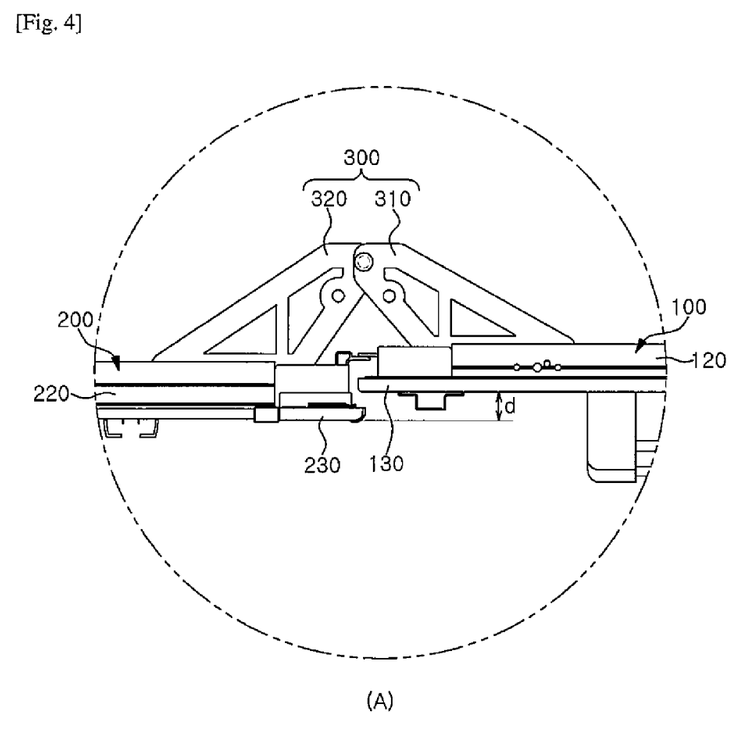
FIG. 4 is an enlarged view of portion A of FIG. 1.

Meanwhile, referring to FIG. 4, the hinge connection portion 300 includes a first hinge member 310 connected to the first cover portion 100 and a second hinge member 320 connected to the second cover portion 200. The first hinge member 310 and the second hinge member 320 may be fixed to each other by a pin so as to be pivotable relative to each other. Accordingly, when switching the mode of the vehicle roof-top tent 10, the first cover portion 100 can be rotated about a connection point of the first hinge member 310 and the second hinge member 320 with respect to the second cover portion 200.

Further, the hinge connection portion 300 may be provided such that the first plate member 110 is disposed at a position higher than the second plate member 210 by a predetermined distance d in the unfolding mode. Accordingly, due to an arrangement between the hinge connection portion 300, the first cover portion 100 and the second cover portion 200, it is possible to prevent interference between the first plate member 110 and the second plate member 210 in a process of switching from the folding mode to the unfolding mode.

In the present embodiment, a case where the position of the first plate member 110 is set to be higher than the position of the second plate member 210 in the unfolding mode has been described as an example, but the present invention is not limited thereto. For example, the position of the first plate member 110 may be set to be lower than the position of the second plate member 210 in the unfolding mode.

Meanwhile, referring to FIG. 5, the waterproof portion 400 is detachably fastened to the rim of the first cover portion 100 and the second cover portion 200 in the folding mode and is provided to close a space between the first cover portion 100 and the second cover portion 200. The waterproof portion 400 may include the first waterproof member 410 and the second waterproof member 420.

The first waterproof member 410 may be configured such that a waterproof cloth is wrapped around the first fastening rod 412 formed of a round bar of a ductile material and the waterproof cloth extends therefrom in one direction. The second waterproof member 420 may be also configured such that a waterproof cloth is wrapped around the second fastening rod 422 formed of a round bar of a ductile material and the waterproof cloth extends therefrom in one direction. Further, the length of the waterproof cloth extending from the first fastening rod 412 of the first waterproofing member 410 and the length of the waterproof cloth extending from the second fastening rod 422 of the second waterproofing member 420 may be different from each other. For example, the length of the waterproof cloth of the first waterproof member 410 may be longer than the length of the waterproof cloth of the second waterproof member 420. As shown in FIG. 5, the waterproof cloth forming the first waterproof member 410 may have a length enough to entirely cover a gap between the first cover portion 100 and the second cover portion 200 in the folding mode. The waterproof cloth may be made of, for example, tarpaulin.

The waterproof cloth of each of the first waterproof member 410 and the second waterproof member 420 may have a fastening line 404 formed thereon and the first waterproof member 410 and the second waterproof member 420 may be detachably fastened to each other along the fastening line 404. The fastening line 404 may be provided as a member having a waterproof function when fastening, and may be provided as a zipper, for example.

In the waterproof portion 400, the first fastening rod 412 of the first waterproof member 410 may be inserted and received in the first waterproof member fastening passage 122 and may be fastened to the first edge frame 120 over the entire edge of the first plate member 110. Further, when the first fastening rod 412 is completely received in the first waterproof member fastening passage 122, both ends of the first waterproof member 410 may be in contact with each other as shown in FIG. 2, thereby forming a joint 402.

Similarly, the second fastening rod 422 of the second waterproof member 420 may be inserted and received in the second waterproof member fastening passage 224 and may be fastened to the second edge frame 220 over the entire edge of the second plate member 210. Further, when the second fastening rod 422 is completely received in the second waterproof member fastening passage 224, both ends of the second waterproof member 420 may be in contact with each other as shown in FIG. 2, thereby forming a joint 402.

A joint cover attaching member 406 may be provided at the periphery of the joint 402 thus formed. The joint cover attaching member 406 may be, for example, provided with Velcro. Since a joint cover 430 is detachably attached to the joint cover attaching member 406, it is possible to prevent water penetration through the joint 402. The joint cover 430 may be made of the same material as the waterproof cloth forming the first waterproof member 410 and the second waterproof member 420.

Further, in a state where the first waterproof member 410 and the second waterproof member 420 are fastened to the first edge frame 120 and the second edge frame 220, respectively, when the first waterproof member 410 and the second waterproof member 420 are fastened to each other through the fastening line 404, the length of the first waterproof member 410 and the length of the second waterproof member 420 may be set to be fastened by the fastening line 404 so that a tension is applied to each waterproof cloth. By the tension applied to the first waterproof member 410 and the second waterproof member 420, the first fastening rod 412 and the second fastening rod 422 can tightly seal the gaps of the first waterproof member fastening passage 122 and the second waterproof member fastening passage 224, respectively. Accordingly, external moisture can be prevented from penetrating into the tent portion 500 in the folding mode.

According to the present embodiment having the configuration described above, when the vehicle is traveling while the roof-top tent is fixed to the roof of the vehicle, it is possible to store the tent portion in a substantially rectangular box shape by the waterproof portion and the first and second cover portions including the two plate members. Thus, it is possible to prevent a problem in which a driver's vision is obstructed due to the fluttering cover made of a cloth material during driving, and minimize the resistance by air during driving. In addition, it is possible to provide a roof-top tent for a vehicle, which has a waterproof function and a neat appearance, by virtue of two plate members which are made of a solid material and a waterproof portion which connects the plate members in a tensionable manner.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Therefore, it should be understood that the above exemplary embodiments are only exemplary, but are not limited. The scope of the present invention is represented by the scope of the accompanying claims, rather than the detailed description. All changes or modifications derived from the meaning and scope of the claims and equivalent concepts thereof should be interpreted as being included in the scope of the present invention.

What is claimed is:

1. A roof-top tent comprising:
   a first cover portion including a first plate member provided in a substantially rectangular shape;
   a second cover portion including a second plate member provided in a substantially rectangular shape;
   a hinge connection portion rotatably connecting the first cover portion and the second cover portion;
   a waterproof portion having both ends fastened to the first cover portion and the second cover portion; and
   a tent portion coupled to the first cover portion and the second cover portion;
   wherein one of the first cover portion and the second cover portion is provided so as to be fixedly installed on a roof of a vehicle;
   wherein the roof-top tent has a folding mode in which the first cover portion and the second cover portion are arranged to face each other and the tent portion is accommodated in a space between the first cover portion and the second cover portion, and an unfolding mode in which the tent portion is unfolded by rotating one of the first cover portion and the second cover portion around the hinge connection portion with respect to the other one; and wherein the waterproof portion is detachably fastened to a rim of the first cover portion and the second cover portion in the folding mode to close the space between the first cover portion and the second cover portion.

2. The roof-top tent of claim 1, wherein the waterproof portion includes:
a first waterproof member including a first fastening rod and provided with a waterproof cloth extending from the first fastening rod; and
a second waterproof member including a second fastening rod and provided with a waterproof cloth extending from the second fastening rod;
wherein the first waterproof member and the second waterproof member are detachably fastened to each other along a fastening line formed in each waterproof cloth.

3. The roof-top tent of claim 2, wherein:
the first cover portion includes a first edge frame having a first waterproof member fastening passage formed to allow insertion of the first fastening rod and having a gap formed along a longitudinal direction;
the second cover portion includes a second edge frame having a second waterproof member fastening passage formed to allow insertion of the second fastening rod and having a gap formed along a longitudinal direction; and
wherein the first waterproof member is fastened to the first edge frame by inserting the first fastening rod into the first waterproof member fastening passage, and the second waterproof member is fastened to the second edge frame by inserting the second fastening rod into the second waterproof member fastening passage.

4. The roof-top tent of claim 3, wherein at least one of the first edge frame and the second edge frame further includes a waterproof protrusion formed to protrude from an inner surface of the first waterproof member fastening passage or the second waterproof member fastening passage to prevent separation of the first fastening rod or the second fastening rod.

5. The roof-top tent of claim 1, wherein the waterproof portion further includes a joint cover detachably attached to the first waterproof member to cover a joint in which both ends of the first waterproof member fastened to the first cover portion are in contact with each other in the folding mode.

6. The roof-top tent of claim 1, wherein a height of a position of the first plate member and a height of a position of the second plate member are different from each other.

7. The roof-top tent of claim 1, further comprising:
a first corner frame covering at least one corner portion of the first plate member; and
a second corner frame covering at least one corner portion of the second plate member;
wherein the first corner frame and the second corner frame have rounded corners.

8. The roof-top tent of claim 7, wherein the first corner frame includes:
an outer fastening member fastened to the at least one corner portion of the first plate member; and
an inner fastening member fastened to the outer fastening member and the first plate member so as to at least partially overlap the outer fastening member.

9. The roof-top tent of claim 7, wherein the second corner frame includes:
a tent outer fastening member fastened to the at least one corner portion of the second plate member so as to be in contact with one surface of the second plate member;
a tent inner fastening member fastened to the tent outer fastening member so as to at least partially overlap the tent outer fastening member;
a waterproof outer fastening member fastened to the at least one corner portion of the second plate member so as to be in contact with the other surface of the second plate member;
a waterproof inner fastening member fastened to the waterproof outer fastening member so as to at least partially overlap the waterproof outer fastening member; and
a fastening rod fixing protrusion protruding from a surface of at least one of the tent outer fastening member, the tent inner fastening member, the waterproof outer fastening member and the waterproof inner fastening member to prevent separation of the waterproof portion fastened to the second cover portion.

10. A roof-top tent comprising:
a first cover portion including a first plate member provided in a substantially rectangular shape;
a second cover portion including a second plate member provided in a substantially rectangular shape;
a hinge connection portion rotatably connecting the first cover portion and the second cover portion;
a waterproof portion attached to the first cover portion and the second cover portion; and
a tent portion coupled to the first cover portion and the second cover portion;
wherein one of the first cover portion and the second cover portion is provided so as to be fixedly installed on a roof of a vehicle; and
wherein the roof-top tent has a folding mode in which the first cover portion and the second cover portion are arranged to face each other and the tent portion is accommodated in a space between the first cover portion and the second cover portion, and an unfolding mode in which the tent portion is unfolded by rotating one of the first cover portion and the second cover portion around the hinge connection portion with respect to the other one.

11. The roof-top tent of claim 10, wherein the waterproof portion is detachably fastened proximate an edge of the first cover portion or proximate an edge of the second cover portion in the folding mode to close the space between the first cover portion and the second cover portion.

12. The roof-top tent of claim 10, wherein the waterproof portion includes:
a first waterproof member including a first fastening rod and provided with a waterproof cloth extending from the first fastening rod; and
a second waterproof member including a second fastening rod and provided with a waterproof cloth extending from the second fastening rod;
wherein the first waterproof member and the second waterproof member are detachably fastened to each other along a fastening line formed in each waterproof cloth.

13. The roof-top tent of claim 12, wherein:
the first cover portion includes a first edge frame having a first waterproof member fastening passage formed to allow insertion of the first fastening rod and having a gap formed along a longitudinal direction;
the second cover portion includes a second edge frame having a second waterproof member fastening passage formed to allow insertion of the second fastening rod and having a gap formed along a longitudinal direction; and
wherein the first waterproof member is fastened to the first edge frame by inserting the first fastening rod into the first waterproof member fastening passage, and the second waterproof member is fastened to the second edge frame by inserting the second fastening rod into the second waterproof member fastening passage.

14. The roof-top tent of claim 13, wherein at least one of the first edge frame and the second edge frame further includes a waterproof protrusion formed to protrude from an inner surface of the first waterproof member fastening passage or the second waterproof member fastening passage to prevent separation of the first fastening rod or the second fastening rod.

15. The roof-top tent of claim 10, wherein the waterproof portion further includes a joint cover detachably attached to the first waterproof member to cover a joint in which both ends of the first waterproof member fastened to the first cover portion are in contact with each other in the folding mode.

16. The roof-top tent of claim 10, wherein a height of a position of the first plate member and a height of a position of the second plate member are different from each other.

17. The roof-top tent of claim 10, further comprising:
a first corner frame covering at least one corner portion of the first plate member; and
a second corner frame covering at least one corner portion of the second plate member;
wherein the first corner frame and the second corner frame have rounded corners.

18. The roof-top tent of claim 17, wherein the first corner frame includes:
an outer fastening member fastened to the at least one corner portion of the first plate member; and
an inner fastening member fastened to the outer fastening member and the first plate member so as to at least partially overlap the outer fastening member.

19. The roof-top tent of claim 17, wherein the second corner frame includes:
a tent outer fastening member fastened to the at least one corner portion of the second plate member so as to be in contact with one surface of the second plate member;
a tent inner fastening member fastened to the tent outer fastening member so as to at least partially overlap the tent outer fastening member;
a waterproof outer fastening member fastened to the at least one corner portion of the second plate member so as to be in contact with the other surface of the second plate member;
a waterproof inner fastening member fastened to the waterproof outer fastening member so as to at least partially overlap the waterproof outer fastening member; and
a fastening rod fixing protrusion protruding from a surface of at least one of the tent outer fastening member, the tent inner fastening member, the waterproof outer fastening member and the waterproof inner fastening member to prevent separation of the waterproof portion fastened to the second cover portion.

* * * * *